H. Pitcher,
Chain Clutch.
No. 110,069.    Patented Dec. 13, 1870.
Fig. 1.
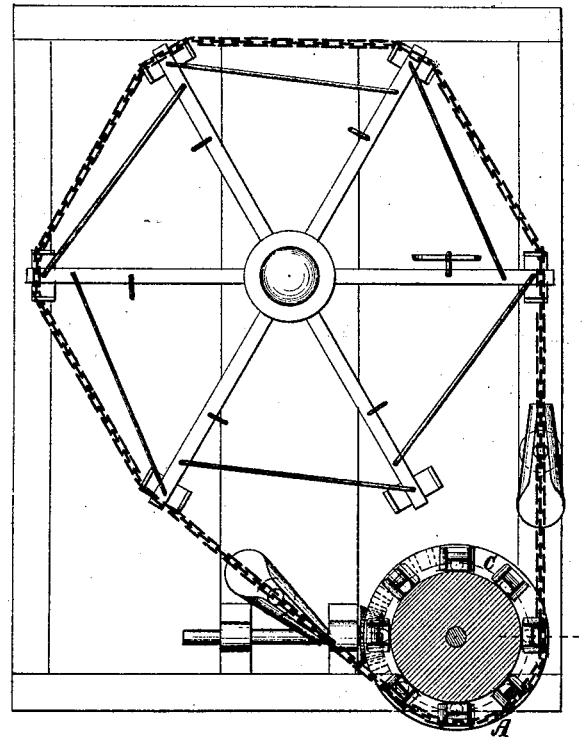
Fig. 4.    Fig. 3.    Fig. 2.
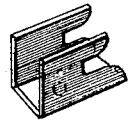   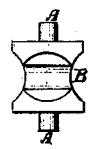   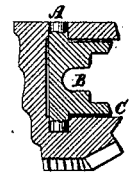
Witnesses:    Inventor:

United States Patent Office.

HIRAM PITCHER, OF FOND DU LAC, WISCONSIN, ASSIGNOR TO HIMSELF AND H. & G. O. TROWBRIDGE, OF SAME PLACE.

Letters Patent No. 110,069, dated December 13, 1870; antedated December 9, 1870.

IMPROVEMENT IN CHAIN-CLUTCHES.

The Schedule referred to in these Letters Patent and making part of the same.

*To all whom it may concern:*

Be it known that I, HIRAM PITCHER, of Fond du lac, in the county of Fond du lac and State of Wisconsin, have invented a new and useful Improvement in Chain-Clutch; and I do hereby declare that the following is a full, clear, and exact description thereof, which will enable others skilled in the art to make and use the same, reference being had to the accompanying drawing forming part of this specification.

This invention relates to a new and useful improvement in clutches for chain-pulleys or wheels and windlasses, and for all purposes to which it is adapted or applicable; and It consists in a series of self-adjusting blocks, each with a recess for receiving and holding a chain, arranged in a groove around a wheel, drum, or windlass, or other revolving body, as hereinafter more fully described.

In the accompanying drawing—

Figure 1 represents a sectional plan view of a horse-power, to which my clutch is applied, to show the manner of its application.

Figure 2 is a side view of the clutch arranged in its groove in the face of a wheel, a section only of the latter being shown.

Figure 3 is a front view of one clutch-block, detached.

Figure 4 is a perspective view of the chain-supports at the ends of the horse-power arms or levers.

Similar letters of reference indicate corresponding parts.

A is the clutch, which is composed of a series of blocks, B, of metal, of a size to correspond with the links of the chain to be used.

The general form of the block is seen in the figs. 2 and 3.

The cavity in the face of each block is designed to receive or inclose the link of the chain, while it will draw upon the end of the adjacent link as well as upon the inclosed link.

These blocks are pivoted at top and bottom in a groove, C, in the face of the wheel, drum, or windlass, or other revolving body, at distances apart to correspond with the links of the chain.

The spaces between the clutches receive the alternate links of the chain as the wheel revolves, holding and conveying, by means of gear-wheels, pulleys, or other devices, the power applied. As the clutch-wheel revolves, the separate blocks, by reason of the pivots by which they are confined in the groove, adjust themselves to the chain so as to hold it firmly whatever may be the amount of power applied.

The advantages of this chain-clutch for horse-powers, hoisting-machines, windlasses, &c., are many, and must be obvious to all.

Having thus described my invention,

I claim as new, and desire to secure by Letters Patent—

1. In combination with a wheel, pulley, drum, windlass, or other revolving body, the clutch A, constructed, arranged, and operating substantially as described.

2. The chain-clutch, provided with trunnions at its inner end, and pivoted so as to be self-adjusting, as shown and described.

HIRAM PITCHER.

Witnesses:
L. E. HAZEN,
R. COOK.